Patented Mar. 17, 1953

2,631,986

UNITED STATES PATENT OFFICE 2,631,986

PRINTING INKS AND PROCESSES FOR PRODUCING THE SAME

Alfred F. Schmutzler, Teaneck, N. J., assignor to American Cyanamid Company, New York, N. Y., a corporation of Maine No Drawing. Application July 2, 1949, Serial No. 102,950

9 Claims. (Cl. 260—22)

This invention relates to steam-setting printing inks. More particularly, this invention relates to steam-setting printing inks comprising a vehicle consisting essentially of a modified alkyd resin dissolved in a dihydric aliphatic alcohol containing from 4 to 6 carbon atoms, and pigment. The vehicle for the printing inks, according to the instant invention, comprises specifically the reaction product of phthalic anhydride and a pentaerythritol modified by a saturated aliphatic acid, having between 8 and 18 carbon atoms dissolved in a solvent. This aliphatic acid may be either a straight or a branched-chain compound.

The object of the instant invention is to produce a steam-setting printing ink which is soluble in a dihydric aliphatic alcohol containing from 4 to 6 carbon atoms. A further object of the instant invention is to produce a steam-setting printing ink which, when dissolved in the aforementioned solvent, is capable of use in the customary steam-setting printing process, even when the relative humidity of the surrounding atmosphere exceeds 50% and, in fact, is adaptable for use when the relative humidity of the surrounding atmosphere is in the vicinity of 95–100 relative humidity. A further object of the present invention is to produce a printing ink which is capable of use at exceedingly high relative humidities, whereby use of such solvents as diethylene glycol are avoided. It has been customary in the practice of printing, when the steam-setting printing process has been adopted, to make use of solvents comparable to diethylene glycol, but the use of such a solvent has necessitated the use of modifiers, in order to make such printing inks utilizable in relatively high humidities. Further advantages and objects of the present invention will become more apparent as the instant disclosure is unfolded in more specific detail.

The following examples will serve to further illustrate in greater detail the preparation of the modified alkyd resins used in the steam-setting printing inks of the instant invention. It must be remembered that these examples are by way of illustration only, and are not to be interpreted as a limitation on the case, except as indicated by the appended claims. All parts are parts by weight.

Resin A 590 parts of phthalic anhydride, 160 parts of lauric acid, and 325 parts of pentaerythritol are introduced into a suitable reaction chamber and are reacted by heating within the range of 170–220° C. until the acid number of the reaction product is about 120. At this point, the modified alkyd resin thus produced will have a softening point of about 86° C. plus or minus two degrees.

In the preparation of the resin hereinabove set forth, it is possible to vary the reaction conditions until an acid number between 110–140 is reached. This is comparable to softening points varying between 90° C. and 70° C. plus or minus two degrees.

Resin B 590 parts of phthalic anhydride, 160 parts of lauric acid, and 245 parts of pentaerythritol are introduced into a suitable reaction chamber and are caused to react by heating within the range of 170–220° C. until the acid number is within the range of 110–140. This modified alkyd resin is then suitable and adaptable for use as a vehicle in the steam-setting printing ink of the instant invention.

Resin C 590 parts of phthalic anhydride, 160 parts of lauric acid, and 340 parts of pentaerythritol are introduced into a suitable reaction chamber, and are caused to react between the temperature of about 170–220° C. until the acid number is within the range of 100–150. The modified alkyd resin thus produced is immediately adaptable for use as a vehicle in the steam-setting printing ink.

Resin D 590 parts of phthalic anhydride, 80 parts of lauric acid, and 300 parts of pentaerythritol are introduced into a reaction chamber and are heated within the range of 170–220° C. until the acid number of the reaction product is within the range of 100–150. The modified alkyd resin thus produced is suitable for use in a steam-setting printing ink.

Resin E 590 parts of phthalic anhydride, 195 parts of 2-ethyl hexoic acid, and 325 parts of pentaerythritol are introduced into a suitable reaction chamber and are heated until an acid number of 150–190 is attained. This heating process will require temperatures within the range of 170–220° C.

Resin F 590 parts of phthalic anhydride, 195 parts of stearic acid, and 325 parts of dipentaerythritol are introduced into a suitable reaction chamber, and are caused to react by heating, preferably within the range of 170–220° C. until the acid number is about 170. This will produce a modified alkyd resin suitable for use as a vehicle in a steam-setting printing ink, having a softening point of about 80° C. plus or minus two degrees.

In the preparation of the modified alkyd resin for use in the vehicle of the instant invention, one may use any saturated aliphatic acid, either straight or branch-chained, having between 8 and 18 carbon atoms. For example, one may use stearic acid, caprylic acid, n-nonylic acid, capric acid, lauric acid, tridecylic acid, myristic acid, pentadecylic acid, palmitic acid, and margaric acid.

These acids may be used either singly or in combination with one another.

In order to produce the desired result, it is imperative that one use a pentaerythritol. This includes tetramethylol methane and dipentaerythritol.

It is desirable to use, as a solvent for the modified alkyd resin to form the vehicle, a dihydric saturated aliphatic alcohol containing from 4 to 6 carbon atoms. Amongst those which may be used are dipropylene glycol, butane diols such as 1,2-butane diol, 1,3-butane diol, or 1,4-butane diol, and the like, pentamethylene glycol, hexamethylene glycol, and their isomers.

In the preparation of the vehicle for the printing inks of the instant invention, it has been pointed out that a pentaerythritol may be used in the preparation of the alkyd resin. The amount of the pentaerythritol which may be used with the phthalic anhydride varies between about 245–370 parts to about 590 parts of phthalic anhydride. When the dipentaerythritol is used in the place of pentaerythritol, the amount substituted will be substantially the same as the amount of pentaerythritol used. This is particularly true when the aliphatic acid selected for use as a modifying agent in the preparation of the alkyd resin is in the lower limit of the 8 to 18 carbon atoms, such as when the 2-ethyl hexoic acid is used as the modifying agent. However, when some of the higher saturated aliphatic acids are used, such as lauric, stearic, and the like, the amount of pentaerythritol can be lessened.

The use of the saturated aliphatic acid with 8 to 18 carbon atoms will vary in the amount that may be used, depending on the particular higher aliphatic acid selected. Broadly one may use 80–210 parts of the higher aliphatic acid per 590 parts of phthalic anhydride in the preparation of the modified alkyd resin. This may be expressed in percentages by weight such as by stating that the weight of the monocarboxylic acid present in the reaction product constitutes from about 13.5% to about 35.6% by weight based on the weight of the phthalic anhydride present. When one chooses to use lauric acid, as a modifying agent in the preparation of the alkyd resin vehicle, one may vary the amount of lauric acid between about 80 parts to about 200 parts, in order that the modified alkyd resin vehicle have the necessary characteristics. The important factor is in the determination of the particular acid number limit, but even this may be varied over a relatively narrow range. Generally, the reaction may be permitted to continue until the acid number is between 100–190. When one selects for use, as a modifying agent in the preparation of the alkyd resin vehicle, lauric acid, the reaction product may be permitted to react until the acid number is within 100–150, but preferably within the range of 110–140. On the other hand, if one selects a lower aliphatic acid, such as 2-ethyl hexoic acid, one may vary the acid number within the limits of 150–190. Of further interest in the preparation of the modified alkyd resin vehicle, it is to be noted that the amount of 2-ethyl hexoic acid may be varied from about 100 to about 210 parts by weight in a co-reaction with about 590 parts of the phthalic acid anhydride and a pentaerythritol.

As pigments in the preparation of this steam-setting printing ink, one may use carbon black or titanium white or any of the well-known yellow pigments which are customarily used in the steam-setting printing inks.

The relative proportions of the modified alkyd resin vehicle to the solvent may be varied in accordance with those proportions which are customarily used in the preparation of steam-setting printing inks.

The relative proportions of the modified alkyd resin to the solvent are generally in the vicinity of equal parts; in other words, ordinarily a 50% solution of the modified alkyd resin is prepared by adding equal parts of the solvent to the modified alkyd resin. It may be desirable, in certain instances, to make the printing ink less viscous, and in that instance, it is possible to prepare solutions with as low a concentration as about 30% modified alkyd resin to 70% of the solvent.

On the other hand, if a thicker paste is desired, one may add a sufficient amount of solvent so as to produce a paste containing about 75% resin solids, based on the total weight of the resin and solvent.

In the formulation of the steam-setting printing inks themselves, the following procedures may be adopted.

*Example 1*

39 parts of the resin A is diluted with an equal amount of dipropylene glycol to give a 50% resin solution. Thereafter 32 parts of dipropylene glycol are added and 120 parts of chrome yellow pigment are added, and blended until the mixture has a uniform consistency. The resulting paste may be passed over a paint roller mill to give it homogeneity.

The printing ink prepared above may be modified by utilizing any of the resins prepared as set forth hereinabove in the place of the resin A.

*Example 2*

To 1200 parts of a titanium dioxide pigment add 700 parts of a 50% solution of the modified alkyd resin B in dipropylene glycol, and add an additional 250 parts of dipropylene glycol. The three ingredients are mixed and blended together until they have a uniform consistency. The preparation of the steam-setting printing ink set forth above may be prepared by substituting in the place of the modified alkyd resin B any of the other modified alkyd resins prepared according to the procedures set forth hereinabove.

Other pigments that may be used, in addition to those mentioned hereinabove, are lithol red, toluidine red, hansa yellow, methyl violet, phosphotungstic toner, and the like.

In the preparation of these various steam-setting printing inks, it is possible to vary the pigment content within about 20 to 30%, based on the total weight of the printing ink. When the 20 to 30% pigment is used, the resin solution varies between about 70–80% wherein the resin and solvent solution may be varied as indicated above.

Other pigments which may be used are carbon black, phthalocyanine blue, phthalocyanine green, and benzidine yellow. When these pigments are used, ordinarily one can make use of lesser quantities, such as between 10 and 20% of the pigment but the amount of resin solution is, as a consequence, increased somewhat, so that the resin solution is generally between 80 and 90% with the resin solids in solution varied as indicated above depending upon a particular consistency desired.

As indicated above, if particularly thick printing ink pastes or particularly thin or fluid printing inks are desired, the proportions may be varied even more widely.

In using the modifier in the preparation of the modified alkyd resin, namely, the higher fatty acids, for practical purposes, it is immaterial which particular acid is selected. The same proportions are generally applicable. The esterification reaction in the preparation of the modified alkyd resin is generally permitted to proceed until the acid number has reached a point between about 100–190; but the determining criterion to be followed in most cases will be that of permitting the reaction to proceed until the modified resin approximates, but does not quite reach, the gel point.

The presence of the higher fatty acids of the esterification reaction serves to modify the ultimate reaction product. However, the presence of the higher fatty acids serves an additional purpose in that it gives a flux to the reacting ingredients, so that in the course of the reaction, the presence of the higher fatty acid can prevent any premature gellation, which may otherwise take place.

I claim:

1. A steam-setting printing ink comprising pigment and a vehicle consisting essentially of the reaction product of phthalic anhydride and a saturated monocarboxylic aliphatic acid having between 8 and 18 carbon atoms, a compound selected from the group consisting of pentaerythritol and dipentaerythritol, in a solvent comprising a dihydric saturated aliphatic alcohol selected from the group consisting of dipropylene glycol and alkane diols containing from 4–6 carbon atoms wherein the weight of the monocarboxylic acid in the reaction product constitutes from 13.5 to 35.6% by weight of the phthalic anhydride present and wherein said reaction product has an acid number of about 100–190.

2. A steam-setting printing ink comprising pigment and a vehicle consisting essentially of the reaction product of phthalic anhydride and a saturated monocarboxylic aliphatic acid having between 8 and 18 carbon atoms, a compound selected from the group consisting of pentaerythritol and dipentaerythritol in propylene glycol, wherein the weight of the monocarboxylic acid in the reaction product constitutes from about 13.5 to 35.6% by weight of the phthalic anhydride present and wherein said reaction product has an acid number of about 100–190.

3. A steam-setting printing ink comprising pigment and a vehicle consisting essentially of the reaction product of phthalic anhydride and a saturated monocarboxylic aliphatic acid having between 8 and 18 carbon atoms, a compound selected from the group consisting of pentaerythritol and dipentaerythritol dissolved in a butane diol, wherein the weight of the monocarboxylic acid in the reaction product constitutes from about 13.5 to 35.6% by weight of the phthalic anhydride present and wherein said reaction product has an acid number of about 100–190.

4. A steam-setting printing ink comprising pigment and a vehicle consisting essentially of the reaction product of phthalic anhydride, a saturated monocarboxylic aliphatic acid having between 8 and 18 carbon atoms, a compound selected from the group consisting of pentaerythritol and dipentaerythritol dissolved in a pentane diol, wherein the weight of the monocarboxylic acid in the reaction product constitutes from 13.5 to 35.6% by weight of the phthalic anhydride present and wherein said reaction product has an acid number of about 100–190.

5. A steam-setting printing ink comprising pigment and a vehicle consisting essentially of the reaction product of phthalic anhydride, lauric acid and a compound selected from the group consisting of pentaerythritol and dipentaerythritol, dissolved in a solvent comprising a dihydric saturated aliphatic alcohol selected from the group consisting of dipropylene glycol and alkane diols containing from 4–6 carbon atoms, wherein the weight of the lauric acid in the reaction product constitutes from 13.5–35.6% by weight of the phthalic acid present and wherein said reaction product has an acid number of about 100–150.

6. A steam-setting printing ink comprising pigment and a vehicle consisting essentially of the reaction product of phthalic anhydride, 2-ethyl hexoic acid, and a compound selected from the group consisting of pentaerythritol and dipentaerythritol dissolved in a solvent comprising a dihydric saturated aliphatic alcohol selected from the group consisting of dipropylene glycol and alkane diols containing from 4–6 carbon atoms, wherein the weight of the 2-ethyl hexoic acid in the reaction product constitutes from 13.5% to 35.6% by weight of the phthalic anhydride present and wherein said reaction product has an acid number of about 150–190.

7. A steam-setting printing ink comprising pigment and a vehicle consisting essentially of the reaction product of phthalic anhydride, stearic acid and a compound selected from the group consisting of pentaerythritol and dipentaerythritol in a solvent comprising a dihydric saturated aliphatic alcohol, selected from the group consisting of dipropylene glycol and alkane diols containing from 4–6 carbon atoms wherein the weight of the stearic acid in the reaction product constitutes from 13.5% to 35.6% by weight of the phthalic anhydride present and wherein said reaction product has an acid number of about 100–190.

ALFRED F. SCHMUTZLER.

REFERENCES CITED

The following references are of record in the file of this patent:

UNITED STATES PATENTS

| Number | Name | Date |
| --- | --- | --- |
| 2,289,638 | Erickson et al. | July 14, 1942 |
| 2,313,328 | Erickson et al. | Mar. 9, 1943 |
| 2,385,613 | Davis | Sept. 25, 1945 |
| 2,427,255 | Burrell et al. | Sept. 9, 1947 |
| 2,437,908 | Chiappe et al. | Mar. 16, 1948 |
| 2,479,836 | Hoback et al. | Aug. 23, 1949 |

OTHER REFERENCES

Wolfe, American Ink Maker, September 1947, pages 55, 57, 59, 61 and 99.